United States Patent [19]

Yamamoto et al.

[11] Patent Number: 5,799,221
[45] Date of Patent: Aug. 25, 1998

[54] CAMERA

[75] Inventors: Harushige Yamamoto, Yamato; Ryoji Okuno, Kawasaki, both of Japan

[73] Assignee: Canon Kabushiki Kaisha, Tokyo, Japan

[21] Appl. No.: 761,247

[22] Filed: Dec. 6, 1996

[51] Int. Cl.[6] .................................. G03B 17/02

[52] U.S. Cl. ............................. 396/535; 396/538

[58] Field of Search .................... 396/535–538, 396/419, 428

[56] References Cited

U.S. PATENT DOCUMENTS 3,593,636  7/1971  Erlichman .................. 396/536

Primary Examiner—David M. Gray
Attorney, Agent, or Firm—Robin, Blecker & Daley

[57] ABSTRACT

A camera to which a tripod is attachable has a camera body into and from which a film cartridge can be loaded and unloaded, and a cover member disposed at a bottom side of the camera body for opening and closing movement with respect to the camera body so as to load and unload the film cartridge into and from the camera body, wherein an interlocking portion for interlocking with the tripod is formed in the cover member.

16 Claims, 3 Drawing Sheets

CAMERA

BACKGROUND OF THE INVENTION

1. Field of the Invention

This invention relates to a camera of the kind having a cover member provided on a bottom side of the camera for loading a film cartridge into the camera.

2. Description of Related Art

In conventional film cartridges to be used for cameras, a leading or forward most portion of film, i.e., a film leader, normally protrudes from the film cartridge, and the film cartridge with the film leader protruding is loaded into the camera so as to be used for photography.

A film cassette has been proposed which, unlike conventional film cassettes, normally has a film leader entirely wound within the film cassette. Such a film cassette is loaded Canto the camera, and the film is advanced out of the cassette by rotating a film cartridge spool thereof. Then, the film leader is driven and guided to a slit portion formed between a pressure plate of the camera and an aperture portion of the camera body. Subsequently, the film leader is wound onto a film winding spool of the camera so as to make an initial setting for photography.

Meanwhile, in most of the conventional cameras, a tripod socket (tripod screw socket) is formed integrally with a body or main frame of the camera.

In the case of a camera using a film cartridge of the above-stated proposed type, an opening is provided in one side of the camera for inserting and extracting the film cartridge into and from a cartridge chamber formed within the camera. The cartridge chamber can be shielded from light by just covering the opening with a cover member. For this purpose, however, a light blocking method of fitting protrudent ribs alternately into each other, as is practiced in fitting a back cover on a main frame in the conventional camera, causes an increase in size of the cover member.

As regards the tripod socket, the conventional arrangement in which the tripod socket is formed integrally with the body or main frame of the camera presents a problem in that, if the tripod socket happens to be damaged by some accident, the body or main frame of the camera must be replaced at a great cost of repair.

BRIEF SUMMARY OF THE INVENTION

This invention is directed to the solution of the problems of the prior art mentioned in the foregoing. In accordance with one aspect of this invention, there is provided a camera to which a tripod is attachable, which comprises a camera body into and from which a film cartridge can be loaded and unloaded, and a cover member disposed at a bottom side of the camera body for opening and closing movement with respect to the camera body so as to load and unload the film cartridge into and from the camera body, wherein an interlocking portion for interlocking with the tripod is formed in the cover member, so that a size of the camera can be reduced and repair work on the cover member when the interlocking portion is damaged can be facilitated.

The above and other aspects and features of this invention will become apparent from the following detailed description of embodiments thereof taken in conjunction with the accompanying drawings.

DETAILED DESCRIPTION OF THE INVENTION

Preferred embodiments of this invention are described below with reference to the drawings.

Figure 1:
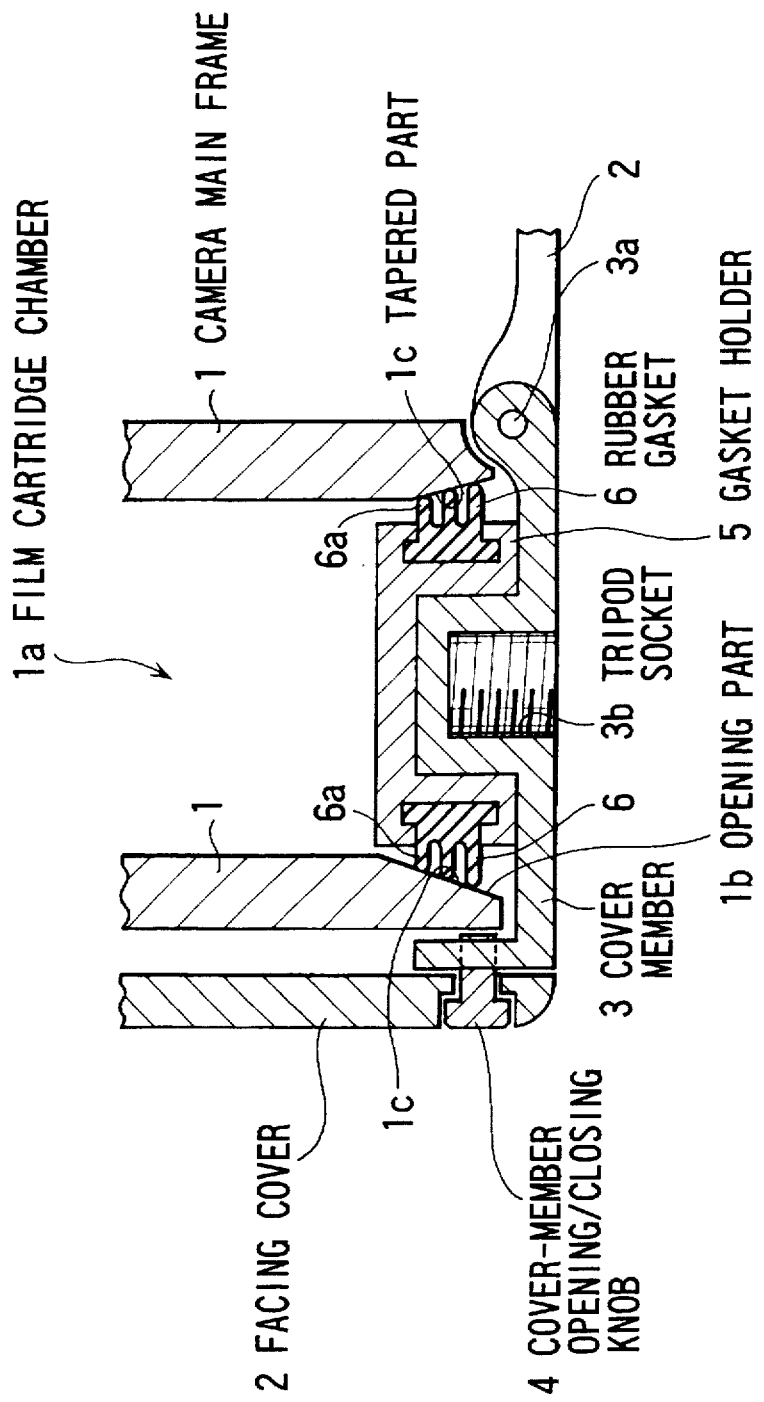
FIG. 1 is a sectional view showing the arrangement of a film cartridge chamber of a camera according to a first embodiment of this invention.

FIG. 1 is a sectional view showing the essential parts of a camera according to a first embodiment of this invention.

Referring to FIG. 1, a main frame of the camera is denoted by reference numeral 1. A film cartridge chamber 1a is formed on one side of the main frame 1. The main frame 1 of the camera is provided with an opening part 1b for inserting a film cartridge into the film cartridge chamber 1a. The opening part 1b has a tapered part 1c formed on the side of its inside diameter. A facing cover 2 is arranged to cover the main frame 1 of the camera. The main frame 1 and the facing cover 2 constitute a body of the camera, i.e., a camera body.

A cover member, which is generally called a cartridge door or a cartridge compartment cover, is denoted by reference numeral 3. The cover member 3 is supported for pivotal movement at a pivot shaft hole 3a on the bottom side of the facing cover 2. The cover member 3 is thus arranged to open and close the opening part 1b of the main frame 1 and is provided with a cover-member opening/closing knob 4 at an outer end side thereof. The cover-member opening/closing knob 4 is exposed to the outside through one side surface of the facing cover 2 and is arranged to permit a camera operator to lock or unlock the cover member 3 by operating the cover-member opening/closing knob 4. The cover member 3 is provided with a protrudent part, which is formed in the middle part on the inner side of the cover member 3. To the protrudent part of the cover member 3 is fixedly secured a gasket holder (packing holder) 5, by which a rubber gasket (rubber packing) 6 serving as an elastic member is held. A tripod socket (tripod screw socket) 3b at which a tripod (not shown) is attachable to the camera is formed integrally with the cover member 3 in the middle part on the outer side of the cover member 3. In taking a photograph by using a tripod, the tripod is attached to the camera through the tripod socket 3b. Further, the rubber gasket 6 is provided with a plurality of lip-like parts 6a formed on the surface thereof.

With the first embodiment arranged as described above, when the cover member 3 is locked, the fore ends of the lip-like parts 6a of the rubber gasket 6 are elastically pushed against the tapered part 1c of the opening part 1b formed in the main frame 1 of the camera. The elastic force of the lip-like parts 6a of the rubber gasket 6 not only effectively eliminates any rattling play between the main frame 1 of the camera and the cover member 3 but also ensures sufficiently tight contact of the rubber gasket 6 with the tapered part 1c of the opening part 1b to reliably shield the film cartridge chamber 1a from light.

Further, if the tripod socket 3b happens to be damaged by some accident, the damage of the tripod socket 3b can be easily repaired by replacing only the cover member 3, since a hinge shaft disposed on the facing cover 2 to be fitted into the pivot shaft hole 3a of the cover member 3 can be removed.

In the case of the first embodiment described above, the rubber gasket 6 is arranged to be held by the cover member 3 and the tapered part 1c is formed at the opening part 1b of the main frame 1 of the camera. However, the same advantageous effect mentioned above is attainable by conversely changing the arrangement in such a manner that a rubber gasket is held on the side of the opening part 1b of the main frame 1 of the camera and a tapered part is formed on the side of the cover member 3.

Furthermore, this invention is not limited to the arrangement of the first embodiment described above. In accordance with this invention, the arrangement of course may be modified and changed in any manner so long as the functions described above and defined by the appended claims are obtainable by such modifications and changes.

A second embodiment of this invention is next described below with reference to FIGS. 2 and 3.

Figure 2:
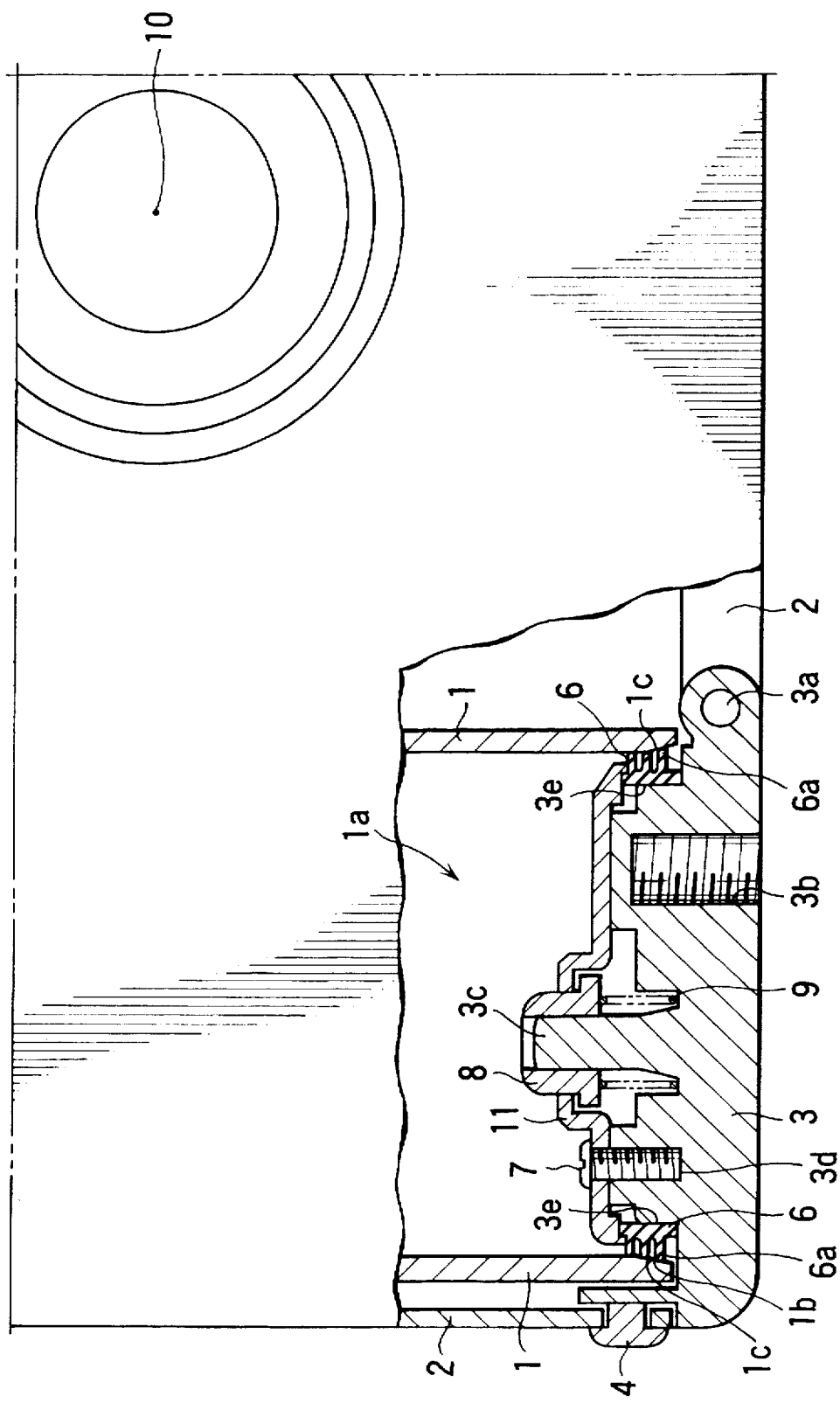
FIG. 2 is a partly sectional view showing the arrangement of a film cartridge chamber of a camera according to a second embodiment of this invention.
Figure 3:
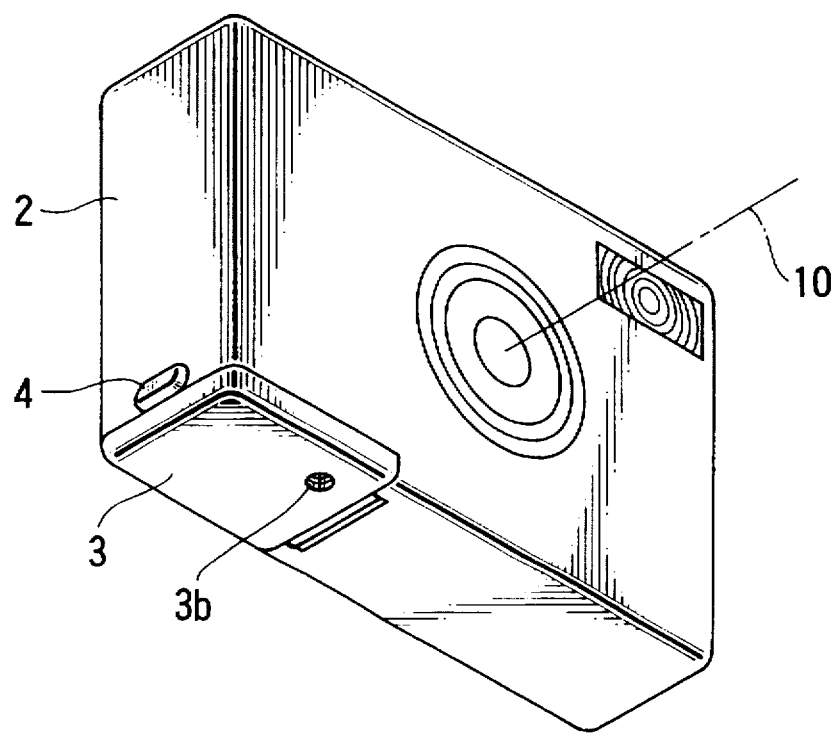
FIG. 3 is a perspective view of the camera according to the second embodiment of this invention.

FIGS. 2 and 3 show the arrangement of essential parts of a camera according to the second embodiment of this invention. FIG. 2 is a sectional view showing the arrangement of the essential parts of the camera. FIG. 3 is a perspective view showing the camera as viewed from the bottom side of the camera.

Referring to FIGS. 2 and 3, a main frame 1 of the camera has a film cartridge chamber 1a arranged on its bottom side to accommodate a film cartridge. The main frame 1 of the camera has a tapered part 1c formed on the inner side of an opening part 1b, which is provided for insertion of the film cartridge into the film cartridge chamber 1a. A facing cover 2 is arranged to cover the main frame 1 of the camera. The main frame 1 and the facing cover 2 constitute a body of the camera, i.e., a camera body.

A cover member 3 is arranged as a cartridge chamber lid to open and close the film cartridge chamber 1a. The cover member 3 is supported for pivotal movement at a pivot shaft hole 3a, which is provided on the bottom side of the facing cover 2, in such a way as to open and close the opening part 1b formed in the bottom of the main frame 1 of the camera. A cover-member opening/closing knob 4 is arranged on the outer end part (left end part as viewed in FIG. 2) of the cover member 3, being exposed on one side surface of the facing cover 2. The cover member 3 is thus arranged to be locked and unlocked by operating the cover-member opening/closing knob 4.

A protrudent part 3e is formed on the inner side of the cover member 3. A rubber gasket (rubber packing) 6 is fixedly secured to the protrudent part 3e and is set in position between the cover member 3 and an inner cover member 11 with a screw 7 screwed into a screw hole 3d formed in the cover member 3. On the outer side of the cover member 3, as shown in FIG. 2, a tripod socket (tripod screw socket) 3b at which a tripod (not shown) is attachable to the camera is formed integrally with the cover member 3. In taking a photograph by using a tripod, the tripod is attached to the camera through the tripod socket 3b. Further, as shown in FIG. 2, a plurality of lip-like parts 6a are formed on the surface of the rubber gasket 6 in such a way as to effectively block any external light from coming into the film cartridge chamber 1a by virtue of the elastic deformation of the lip-like parts 6a.

The inner cover member 11 is arranged not only to fix the rubber gasket 6 in position, as mentioned above, but also to pinch and support in conjunction with the cover member 3 a support member 8, which is arranged to support an end face of a spool disposed within a film cartridge (not shown) loaded into the cartridge chamber 1a. The support member 8 is fitted on a shaft 3c provided on the cover member 3. A coiled spring 9 is arranged to cause the support member 8 to push the film cartridge in such a direction as to be inserted into the cartridge chamber 1a.

The tripod socket 3b is located near the pivot shaft hole 3a (hinge portion) with respect to the middle of the cover member 3. Further, since the pivot shaft hole (hinge portion) 3a is located near a photographing optical axis 10 of the camera (the center of the camera), as shown in FIGS. 2 and 3, the tripod socket 3b is also located near the photographing optical axis 10 (the center of the camera). This arrangement effectively reduces a load imposed on the pivot shaft hole 3a (hinge portion), thereby preventing the cover member 3 from deforming, and thus increasing the durability of the hinge portion.

The arrangement of the second embodiment described above has three features as follows.

A first feature of the second embodiment lies in that the tripod socket 3b is formed in the cover member 3 in a position selected by avoiding a position where the support member 8 for pushing a film cartridge into the film cartridge chamber 1a is disposed. This positional arrangement permits a reduction in thickness of the cover member 3. More specifically, should the tripod socket 3b be formed in the middle of the cover member 3, the tripod socket 3b would necessitate an increase in thickness of the cover member 3 or it would be difficult to secure a sufficient thickness for the screwed engagement. The arrangement of the second embodiment for forming the tripod socket 3b in a redundant thickness part of the cover member 3, on the other hand, gives a sufficient threading margin for the tripod socket 3b despite a relatively thin thickness of the cover member 3. The arrangement of the second embodiment, therefore, effectively contributes to a reduction in size of the camera.

Further, since the cover member 3 is provided with the support member 8 which is arranged to retain in place the end face of a film cartridge spool disposed within a film cartridge (not shown) after the film cartridge is inserted, the film cartridge inserted into the film cartridge chamber 1a is accurately positioned, so that a film which has been sent out from the film cartridge can be accurately transported within the camera.

A second feature of the second embodiment lies in that the tripod socket 3b is located adjacent to the pivot shaft hole 3a (hinge portion) of the cover member 3. With the tripod socket 3b located in this position, a load imposed on the hinge portion can be lessened, thereby preventing the cover member 3 from being damaged.

A third feature of the second embodiment lies in that the pivot shaft hole 3a (hinge portion) of the cover member 3, which has the tripod socket 3b located adjacent to the pivot shaft hole 3a (hinge portion), is disposed as close as possible to the center of the camera, i.e., to the photographing optical axis 10 of the camera. This arrangement shortens a distance from the tripod to a point of static pressure from the upper part of the camera, so that the possibility of having the tripod socket 3b damaged by the static pressure can be lessened. The cover member 3 thus can be prevented from being deformed or damaged due to the static pressure. The camera thus can be set in an adequately balanced state when a tripod is attached to the camera.

The foregoing description of the preferred embodiments clearly indicates the individual elements of this invention. However, this invention is, of course, not limited to the arrangements of the embodiments described above. This invention may be practiced in any manner so long as the functions defined by the appended claims and shown in the foregoing description of the above embodiments are obtainable.

In the second embodiment described above, the support member 8 which supports the film cartridge is formed separately from the cover member 3. However, this arrangement may be changed to have the support member 8 formed integrally with the cover member 3.

Further, in the second embodiment described above, the hinge portion of the cover member 3 is disposed near the center of the bottom side of the camera (near the photographing optical axis 10), as shown in FIGS. 2 and 3. However, even if the hinge portion of the cover member 3 is disposed near the end of the bottom side of the camera (i.e., the arrangement opposite to that shown in FIG. 2), the second feature described above can be attained, that is, the load imposed on the hinge portion can be lessened to effectively prevent the cover member 3 from being damaged, if the tripod socket 3b is located adjacent to the hinge portion of the cover member 3.

We claim:

1. A camera to which a tripod is attachable, comprising:
   a) a camera body into and from which a film cartridge can be loaded and unloaded; and
   b) a cover member disposed at a bottom side of said camera body for opening and closing movement with respect to said camera body so as to load and unload the film cartridge into and from said camera body, wherein an interlocking portion for interlocking with the tripod is formed in said cover member.

2. A camera according to claim 1, wherein said cover member has a hinge portion, and said interlocking portion is formed adjacent to said hinge portion.

3. A camera according to claim 2, wherein said cover member is mounted on said camera body such that said hinge portion is located near a central portion of said camera body.

4. A camera according to claim 1, wherein a pushing portion which pushes the film cartridge loaded into said camera body is formed on an inner side of said cover member, and said interlocking portion is formed in a position located away from an outer side of said pushing portion.

5. A camera according to claim 4, wherein said pushing portion is arranged to push a spool of the film cartridge when said cover member is closed.

6. A camera according to claim 4, wherein said cover member has a hinge portion, and said interlocking portion is formed between the outer side of said pushing portion and said hinge portion.

7. A camera according to claim 1, wherein said cover member is disposed adjacent to an end of the bottom side of said camera body.

8. A camera according to claim 1, wherein a film cartridge chamber having an opening is formed in said camera body, and said cover member is disposed in such a position to cover the opening of said film cartridge chamber.

9. A camera according to claim 8, wherein said cover member is approximately equal in size to the opening of said film cartridge chamber.

10. A camera according to claim 1, wherein said cover member is provided with an elastic member for blocking light.

11. A camera according to claim 1, wherein said interlocking portion is a tripod screw socket.

12. A camera to which a tripod is attachable, comprising:
    a) a camera body; and
    b) a cover member disposed at a bottom side of said camera body for opening and closing movement with respect to said camera body, wherein an interlocking portion for interlocking with the tripod is formed in said cover member.

13. A camera according to claim 12, wherein said cover member has a hinge portion, and said interlocking portion is formed adjacent to said hinge portion.

14. A camera according to claim 13, wherein said cover member is mounted on said camera body such that said hinge portion is located near a central portion of said camera body.

15. A camera according to claim 12, wherein said cover member is disposed adjacent to an end of the bottom side of said camera body.

16. A camera according to claim 12, wherein said interlocking portion is a tripod screw socket.

* * * * *

UNITED STATES PATENT AND TRADEMARK OFFICE
CERTIFICATE OF CORRECTION

PATENT NO. : 5,799,221

DATED : August 25, 1998

INVENTOR(S) : Harushige Yamamoto, etal.

It is certified that error appears in the above-identified patent and that said Letters Patent is hereby corrected as shown below:

Col. 1, line 17, delete "Canto" and insert --into--.

Signed and Sealed this

Sixteenth Day of February, 1999

Attest:

Attesting Officer

*Acting Commissioner of Patents and Trademarks*